United States Patent
Berghian et al.

(10) Patent No.: US 12,247,667 B2
(45) Date of Patent: Mar. 11, 2025

(54) SPLIT PISTON RING UNIT

(71) Applicant: MAHLE International GmbH, Stuttgart (DE)

(72) Inventors: Petru M. Berghian, Livonia, MI (US); Fabio Mendes de Araujo, Waterford, MI (US)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/196,423

(22) Filed: May 11, 2023

(65) Prior Publication Data
US 2024/0376981 A1    Nov. 14, 2024

(51) Int. Cl.
*F16J 9/20*    (2006.01)

(52) U.S. Cl.
CPC ........................ *F16J 9/20* (2013.01)

(58) Field of Classification Search
CPC .................. F16J 9/20; F16J 9/24; F16J 9/26; F02F 5/00; F02F 11/00; B23P 15/08
See application file for complete search history.

(56) References Cited

U.S. PATENT DOCUMENTS

| | | | | |
|---|---|---|---|---|
| 1,261,897 A * | 4/1918 | Bernard | ...................... | F16J 9/14 277/498 |
| 1,406,054 A * | 2/1922 | Menzenwerth | ............ | F16J 9/14 277/492 |
| 3,655,208 A * | 4/1972 | Walker | ........................ | F16J 9/28 277/497 |
| 4,192,051 A | 3/1980 | Bergeron | | |
| 5,261,362 A * | 11/1993 | Regueiro | ................... | F16J 9/16 277/494 |
| 11,346,332 B2 * | 5/2022 | Kanei | ........................ | F16J 9/16 |
| 2006/0249913 A1 * | 11/2006 | Nessa | ........................ | F16J 9/16 277/493 |
| 2015/0007791 A1 | 1/2015 | Dellora | | |
| 2015/0323073 A1 * | 11/2015 | Meacham | .................. | F16J 9/12 277/449 |
| 2023/0137241 A1 * | 5/2023 | Muñoz | ....................... | F16J 9/24 123/193.4 |

FOREIGN PATENT DOCUMENTS

JP    H0248709 Y2 * 12/1990

* cited by examiner

*Primary Examiner* — Grant Moubry
(74) *Attorney, Agent, or Firm* — Fishman Stewart PLLC

(57) ABSTRACT

A split piston ring unit may include a first ring body, a second ring body, and a spacer insert. The first ring body may define a first circumferential gap. The second ring body may define a second circumferential gap. The spacer insert may be coupled to the first ring body and the second ring body. The first ring body and the second ring body may be arranged coaxially and oriented in an offset orientation where the first circumferential gap and the second circumferential gap are disposed circumferentially offset from one another by an offset distance. The spacer insert may be disposed in the offset distance between the first circumferential gap and the second circumferential gap to maintain the offset orientation.

20 Claims, 8 Drawing Sheets

SPLIT PISTON RING UNIT

TECHNICAL FIELD

This disclosure relates generally to pistons and piston rings, and particularly to split piston ring units for pistons of internal combustion engines.

BACKGROUND

A power cylinder assembly of an internal combustion engine generally includes a reciprocating piston disposed within a cylindrical cavity of an engine block. One end of the cylindrical cavity is closed while another end of the cylindrical cavity is open. The closed end of the cylindrical cavity and an upper portion or crown of the piston defines a combustion chamber. The open end of the cylindrical cavity permits oscillatory movement of a connecting rod, which joins a lower portion of the piston to a crankshaft, which is partially submersed in an oil sump. The crankshaft converts linear motion of the piston (resulting from combustion of fuel in the combustion chamber) into rotational motion.

The power cylinder assembly typically includes one or more piston rings that are disposed in grooves formed in the lateral walls of the piston, and extend outwardly from the piston into an annular space delineated by the piston wall and a cylinder wall defining the cylindrical cavity. During movement of the piston within the cylindrical cavity, the piston rings bear against the cylinder wall. The piston rings have at least two functions. First, they are meant to inhibit gas flow from the combustion chamber into the oil sump through the annular space between the piston and the cylinder wall. Second, they are intended to help minimize oil flow from the oil sump into the combustion chamber.

The number of piston rings and ring-shaped grooves varies depending on engine type. For example, some pistons include three piston rings that may each serve a different primary purpose or function. For example, a combustion ring is generally arranged in an upper ring groove. The combustion ring typically seals the combustion chamber from leakage during combustion of the air-fuel mixture, and transfers heat from the combustion chamber to the cylinder wall. In this way, the combustion ring blocks a majority of combustion gases from passing the piston (e.g., through the annular space between the piston and the cylinder liner) to inhibit gas flow from the combustion chamber into the oil sump. An oil control ring is generally arranged in a lower ring groove. The oil control ring typically controls the supply of oil for lubrication purposes. A scraper ring is generally arranged in an intermediate or middle ring groove. The scraper ring typically minimizes oil consumption and controls distribution of oil between the piston and the cylinder wall. To minimize oil consumption, the scraper ring scrapes oil from the cylinder wall during the downstroke of the piston in the direction of the oil chamber. On the upstroke, the scraper ring slides over the oil to avoid scraping it.

The combustion ring is generally a split ring which is characterized as having a gap. The combustion ring is typically exposed to high temperatures during operation, which tends to cause the combustion ring to expand. The expansion of the combustion ring causes its circumferential length to increase (e.g., a few tenths of a millimeter) so that its outer diameter exceeds the nominal diameter of the cylinder cavity. The gap in the combustion ring facilities this expansion during operation, among other things. The gap in the combustion ring, however, also breaks the continuity of the ring. This may compromise the sealing properties of the combustion ring and promotes blowby since combustion gas is able to flow through the gap and bypass the combustion ring. When the circumferential length of the gap is too large, excessive blowby occurs. When the circumferential length of the gap is too small, there is a risk that the circumferential ends of the combustion ring contact one another due to thermal expansion.

Some combustion rings are designed as ring assemblies including multiple annular bodies. For example, US2015007791A1 describes a sealing unit with two annular bodies each having a gap section, where the gap sections of the two annular bodes are disposed in different positions. As another example, U.S. Pat. No. 4,192,051A describes two identical gap ring elements, each with overlapping fingers formed in the circumferential direction. Many ring assemblies, however, allow the annular bodies to move relative to one another. This can result in the gaps of the annular bodies becoming aligned with one another in an axial direction, which can negatively impact blowby performance. Conversely, ring assemblies may be fixed connected together (e.g., welded) to prevent relative movement, which however increases manufacturing costs and complexity as well as increases the risk of ring fracture due to the greater thermal loads and thus expansion of the upper ring relative to the lower ring that may be experienced during operation.

As such, there is a need to improve piston ring designs.

SUMMARY

An object of the disclosure is to provide a split piston ring unit with enhanced sealing properties and improved manufacturing tolerances, so as to improve blowby performance and decrease manufacturing costs.

According to a first aspect of the disclosure, there is provided a split piston ring unit including a first ring body, a second ring body, and a spacer insert. The first ring body defines a first circumferential gap. The second ring body defines a second circumferential gap. The spacer insert is coupled to the first ring body and the second ring body. The first ring body and the second ring body are arranged coaxially and oriented in an offset orientation where the first circumferential gap and the second circumferential gap are disposed circumferentially offset from one another by an offset distance. The spacer insert is disposed in the offset distance between the first circumferential gap and the second circumferential gap to maintain the offset orientation.

The provision of the offset orientation of the first ring body and the second ring body effectively blocks air (e.g., combustion gas) from flowing through the gaps, which significantly restricts and/or effectively prevents blowby at the outer diameter of the split piston ring unit. In this manner, the split piston ring unit virtually eliminates the blowby the occurs in conventional split piston rings due to the gap and, thus, outperforms conventional split piston rings with respect to blowby. Furthermore, due to the offset orientation of the first ring body and the second ring body, the size of the gaps has a reduced impact on blowby performance of the split piston ring unit compared to conventional split piston rings, which enables the gaps to have a larger circumferential length then conventional split piston rings without sacrificing blowby performance. For example, the gaps of the split piston ring unit described herein may each have a circumferential length of up to 1.5 mm, while conventional split piston rings generally require gaps having a circumferential length of 0.5 mm or less (e.g., usually of 0.1 to 0.5 mm). This in turn increases manufacturing tolerances, decreases manufacturing costs, and reduces the risk associated with the circumferential ends of the ring bodies contacting one another during operation (e.g., due to thermal expansion).

The provision of the spacer insert effectively prevents the ring bodies from moving and/or shifting out of the offset orientation while simultaneously allowing the split piston ring unit to move relative to the piston body to ensure proper functioning and performance of the split piston ring unit during operation.

Pursuant to an implementation, the first ring body includes a first recess disposed at the first circumferential gap. The second ring body includes a second recess disposed at the second circumferential gap. The first recess and the second recess at least partially overlap one another. The spacer insert is disposed in the first recess and the second recess to separate the first circumferential gap from the second circumferential gap.

The first recess and the second recess may be disposed on a radially inner side of the first ring body and the second ring body, respectively.

The first ring body has a first circumferential end face and a second circumferential end face defining the first circumferential gap therebetween. The first recess may open into the first circumferential gap through the first circumferential end face of the first ring body. The second ring body has a first circumferential end face and a second circumferential end face defining the second circumferential gap therebetween. The second recess may open into the second circumferential gap through the first circumferential end face of the second ring body.

The first recess is defined by a first recess base surface of the first ring body and a first radially outwardly sloped surface of the first ring body extending from the first recess base surface to the first circumferential end face of the first ring body. The second recess is defined by a second recess base surface of the second ring body and a second radially outwardly sloped surface of the second ring body extending from the second recess base surface to the second circumferential end face of the second ring body.

The first ring body extends from the first circumferential end face to the second circumferential end face in a first circumferential direction. The second ring body extends from the first circumferential end face to the second circumferential end face in a second circumferential direction opposite the first circumferential direction.

Pursuant to an implementation, the spacer insert includes a base body, a first projection extending circumferentially from a first end of the base body, and a second projection extending circumferentially from a second end of the base body.

The first projection and the second projection protrude radially outward from the base body.

The first projection and the second projection are angled radially outward and extend obliquely relative to the base body. The provision of the angled first and second projection enables the spacer insert to maintain its full, three-dimensional degree of freedom within the recesses.

Pursuant to an implementation, the second ring body has a plasma-coated layer disposed thereon. The provision of the second ring body with the plasma-coated layer reduces lubricating oil consumption. It also reduces tension on the second ring body since there is no gas pressure at the outer diameter of the second ring body or at the second piston ring land, which in turn reduces and/or eliminates the risk of the second ring body fracturing.

Pursuant to an implementation, the first ring body covers an axial end of the second circumferential gap. The second ring body covers an axial end of the first circumferential gap. As such, air (e.g., combustion gas) is effectively blocked from flowing through the gaps, which significantly restricts and/or effectively prevents blowby at the outer diameter of the split piston ring unit.

At least one of the first ring body and the second ring body is at least one of a barrel-shaped outer diameter ring body and a tapered outer diameter ring body. The provision of a barrel-shaped outer diameter ring body is that the outer radial surface defines a symmetrical profile, which may reduce the manufacturing costs of the ring bodies and/or allow low-cost piston rings to be utilized for the ring bodies.

The first ring body, the second ring body, and the spacer insert are movable relative to one another. Relative movement of the first ring body, the second ring body, and the spacer insert is limited via the spacer insert.

According to a second aspect of the disclosure, there is provided a piston for a combustion engine including at least one ring groove and a split piston ring unit arranged in the at least one ring groove. The split piston ring unit includes a first ring body, a second ring body, and a spacer insert. The first ring body defines a first circumferential gap. The second ring body defines a second circumferential gap. The spacer insert is coupled to the first ring body and the second ring body. The first ring body and the second ring body are arranged coaxially and oriented in an offset orientation where the first circumferential gap and the second circumferential gap are disposed circumferentially offset from one another by an offset distance. The spacer insert is disposed in the offset distance between the first circumferential gap and the second circumferential gap to maintain the offset orientation.

The first ring body includes a first recess disposed at the first circumferential gap. The second ring body includes a second recess disposed at the second circumferential gap. The first recess and the second recess overlap one another. The spacer insert is disposed in the first recess and the second recess to separate the first circumferential gap from the second circumferential gap.

The first ring body covers an axial end of the second circumferential gap. The second ring body covers an axial end of the first circumferential gap.

The spacer insert includes a base body, a first projection extending circumferentially from a first end of the base body, and a second projection extending circumferentially from a second end of the base body. The first projection and the second projection are angled radially outward and extend obliquely relative to the base body.

According to a third aspect of the disclosure, there is provided an internal combustion engine including at least one cylinder, a piston slidably arranged in the at least one cylinder, and a split piston ring unit arranged in a ring groove of the piston. The split piston ring unit includes a first ring body, a second ring body, and a spacer insert. The first ring body defines a first circumferential gap. The second ring body defines a second circumferential gap. The spacer insert is coupled to the first ring body and the second ring body. The first ring body and the second ring body are arranged coaxially and oriented in an offset orientation where the first circumferential gap and the second circumferential gap are disposed circumferentially offset from one another by an offset distance. The spacer insert is disposed in the offset distance between the first circumferential gap and the second circumferential gap to maintain the offset orientation.

The first ring body includes a first recess disposed at the first circumferential gap. The second ring body includes a second recess disposed at the second circumferential gap. The first recess and the second recess overlap one another. The spacer insert is disposed in the first recess and the second recess to separate the first circumferential gap from the second circumferential gap.

The spacer insert includes a base body, a first projection, and a second projection. The first projection and the second projection protrude radially outward from the base body and are disposed at opposite ends of the base body.

Other objectives, features and advantages of the present disclosure will appear from the following detailed disclosure, from the attached claims as well as from the drawings. Implementations of the disclosure may include combinations of the above-described features.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Figure 1:
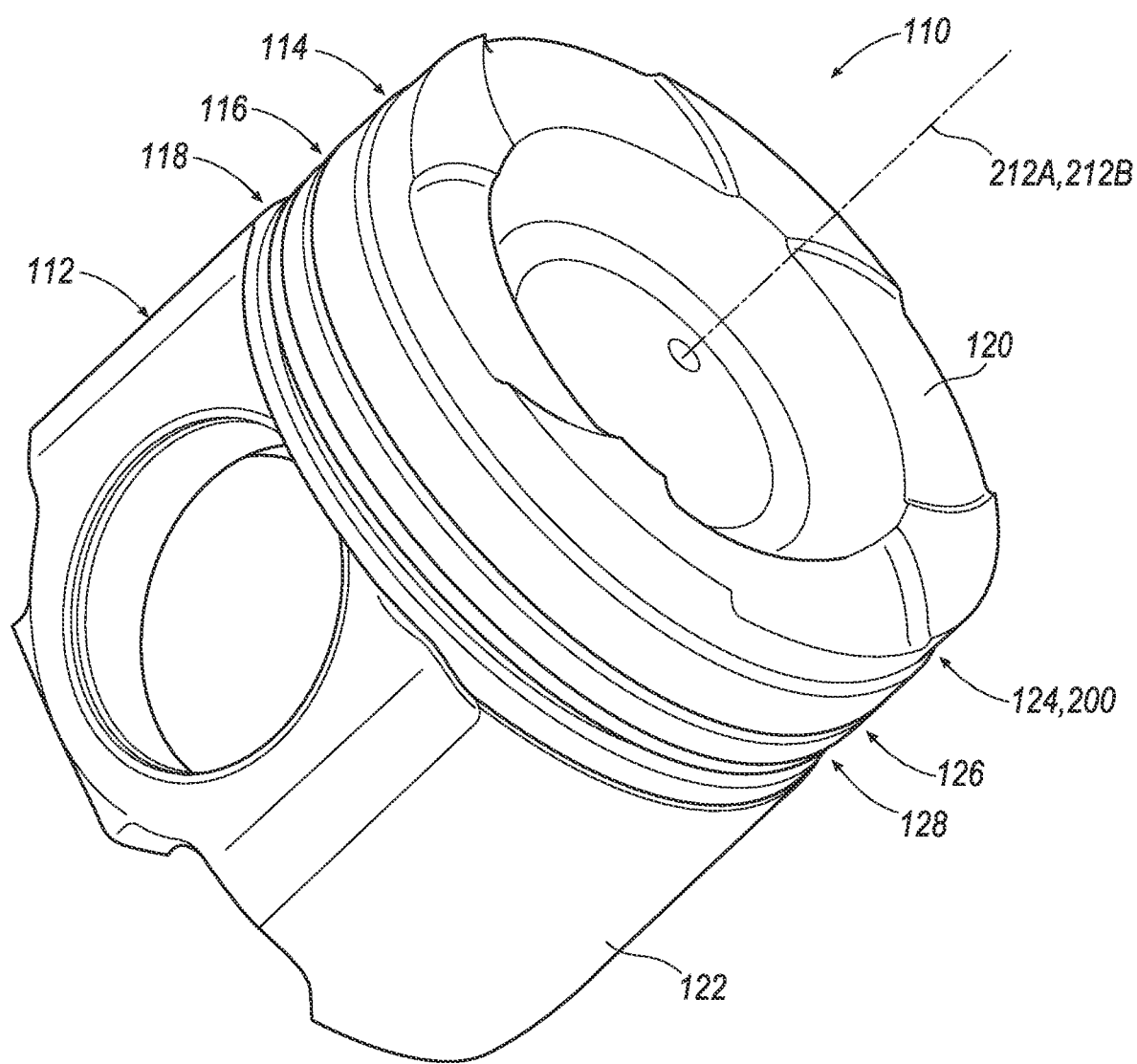
FIG. 1 is a perspective view of an exemplary piston including an exemplary split piston ring unit.

In the drawings, where like numerals and characters indicate like or corresponding parts throughout the several views, exemplary illustrates are shown in detail. The various features of the exemplary approaches illustrated and described with reference to any one of the figures may be combined with features illustrated in one or more other figures, as it will be understood that alternative illustrations that may not be explicitly illustrated or described may be able to be produced. The combinations of features illustrated provide representative approaches for typical applications. However, various combinations and modifications of the features consistent with the teachings of the present disclosure may be desired for particular applications or implementations.

Referring to FIG. 1, an exemplary piston 110 for an internal combustion engine 100 is illustrated. The internal combustion engine may be a spark ignited gasoline engine, a high speed diesel engine, a heavy duty diesel engine, a medium duty diesel engine, and/or a spark ignited hydrogen engines, among others. The piston 110 includes a piston body 112 and a plurality of piston rings 124, 126, 128. The piston body 112 includes a plurality of ring grooves 114, 116, 118 configured to receive the piston rings 124, 126, 128. The ring grooves 114, 116, 118 includes an upper ring groove 114, an intermediate or middle ring groove 116, and a lower ring groove 118. The upper ring groove 118 is disposed closest to a piston crown 120 of the piston 110. The lower ring groove 118 is disposed closest to a piston skirt 122 of the piston 110. The intermediate ring groove 116 is disposed axially between the upper ring groove 114 and the lower ring groove 118. The piston 110 is not limited to three ring grooves 114, 116, 118 and may have any number of desired ring grooves (e.g., two ring grooves 114, 118). The plurality of piston rings 124, 126, 128 includes a combustion ring 124 arranged within the upper ring groove 114, a scraper ring 126 arranged within the intermediate ring groove 116, and an oil control ring 128 arranged within the lower ring groove 118. The piston rings 124, 126, 128 are configured to contact and seal against a surface 104 of a cylinder 102 of an internal combustion engine 100 in which the piston 110 is slidably disposed (see FIG. 2). During operation, the piston 110 moves axially within the cylinder 102 in a reciprocal motion. The piston 110 generally moves in a first axial or upward direction during an upstroke phase of the piston 110 and a second axial or downward direction during a downstroke phase of the piston 110. The combustion ring 124 is configured as a split piston ring unit 200 according to the present disclosure. However, the piston 110 may benefit from any one or all of the piston rings 124, 126, 128 being configured as a split piston ring unit 200 according to the present disclosure. Thus, any one or all of the piston rings 124, 126, 128 of FIG. 1 may be configured as a split piston ring unit 200.

Figure 2:
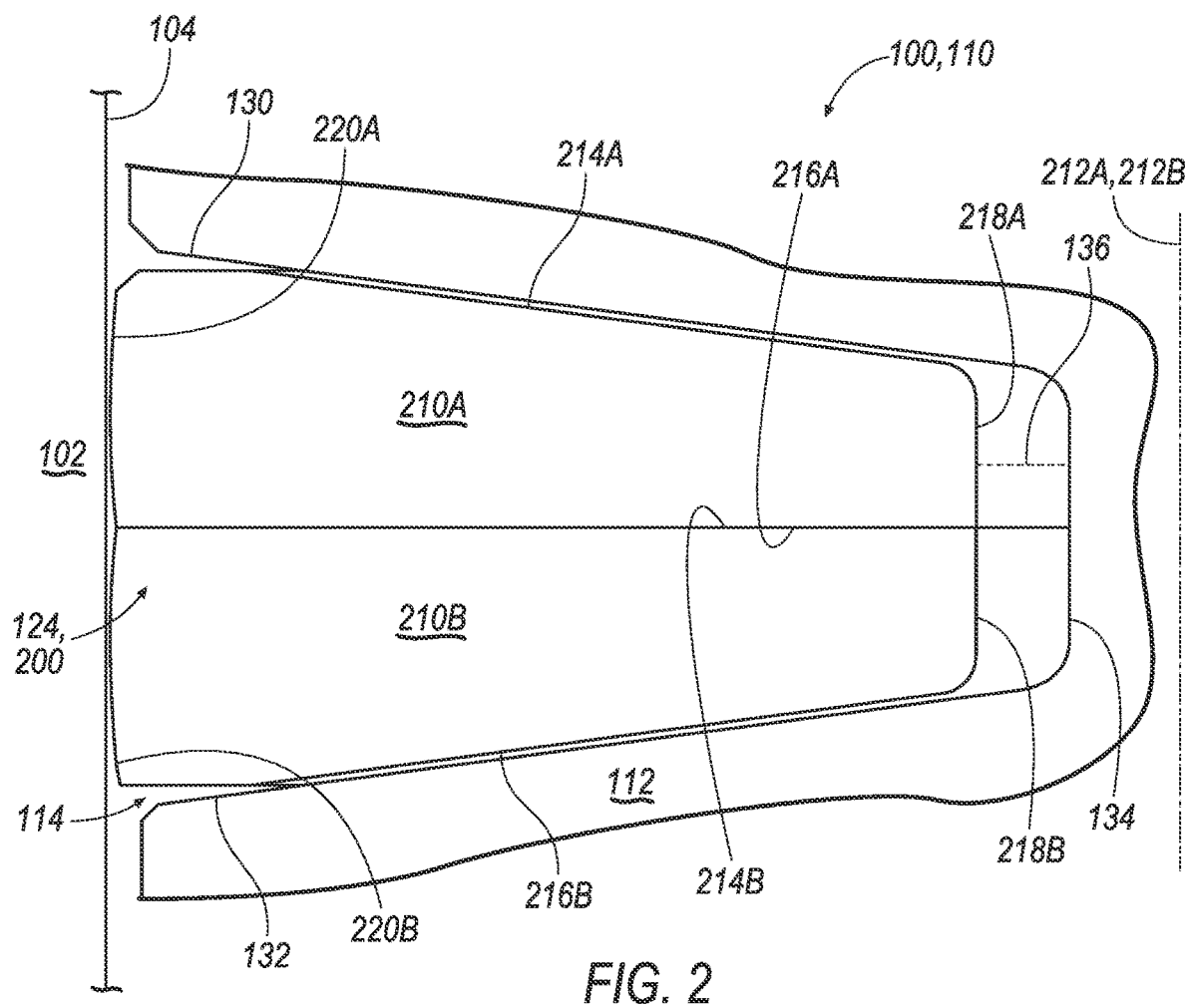
FIG. 2 is a cross-sectional view of the split piston ring unit disposed in a ring groove of the piston of FIG. 1.
Figure 3:
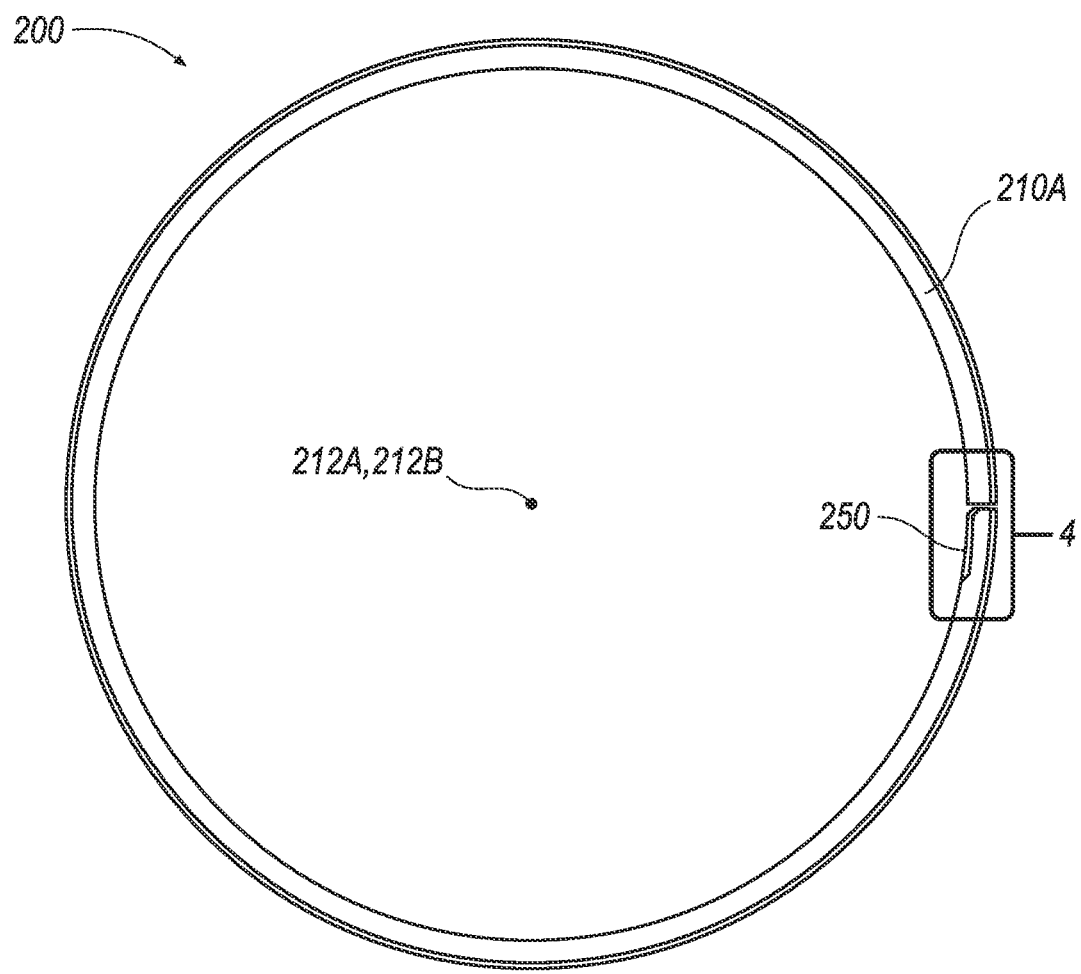
FIG. 3 is an axially downward view of the split piston ring unit of FIG. 1.
Figure 4:
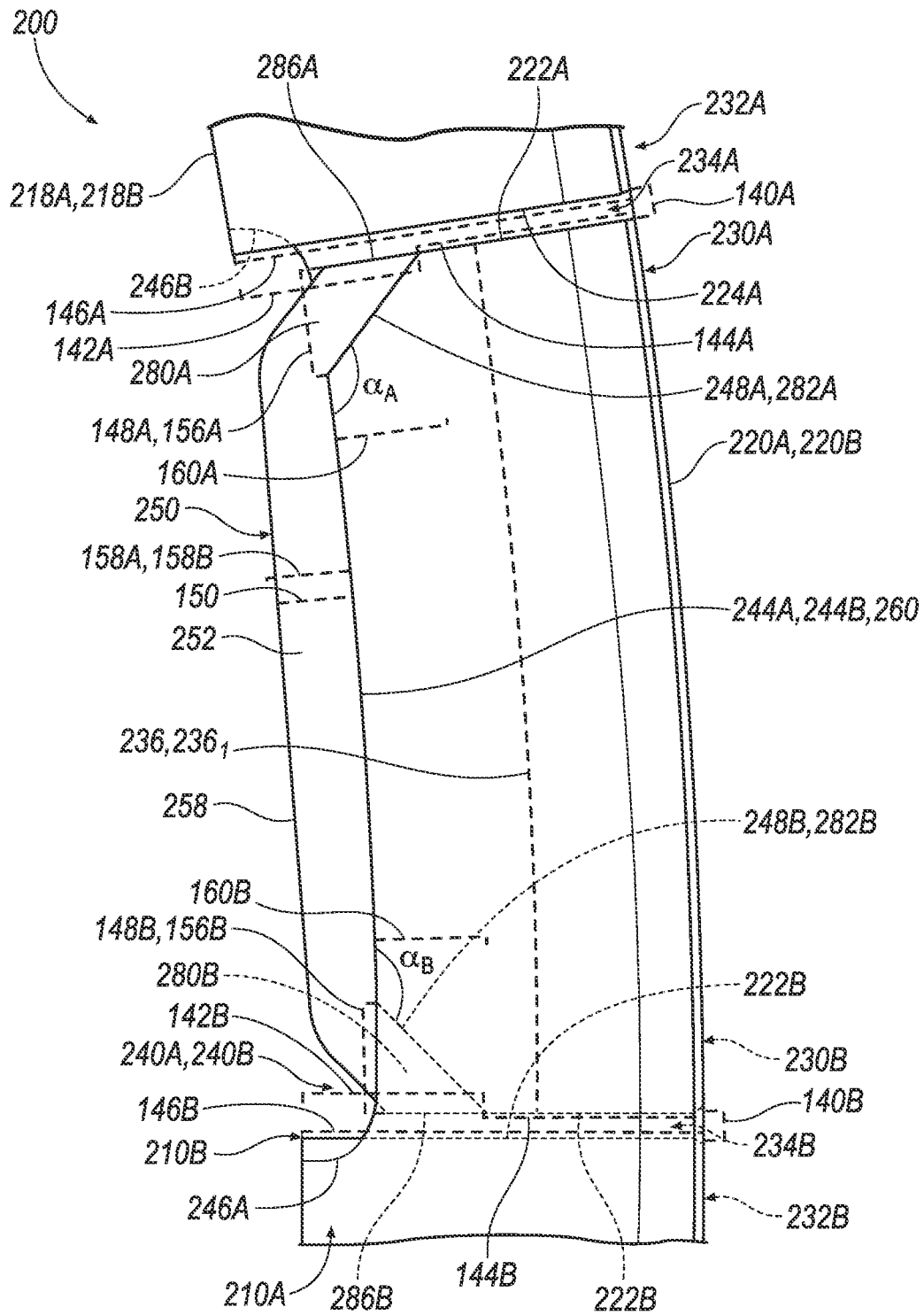
FIG. 4 is a close-up, axially downward view of the portion 4 of the split piston ring unit of FIG. 3 with the split piston ring unit in a first position.
Figure 5:
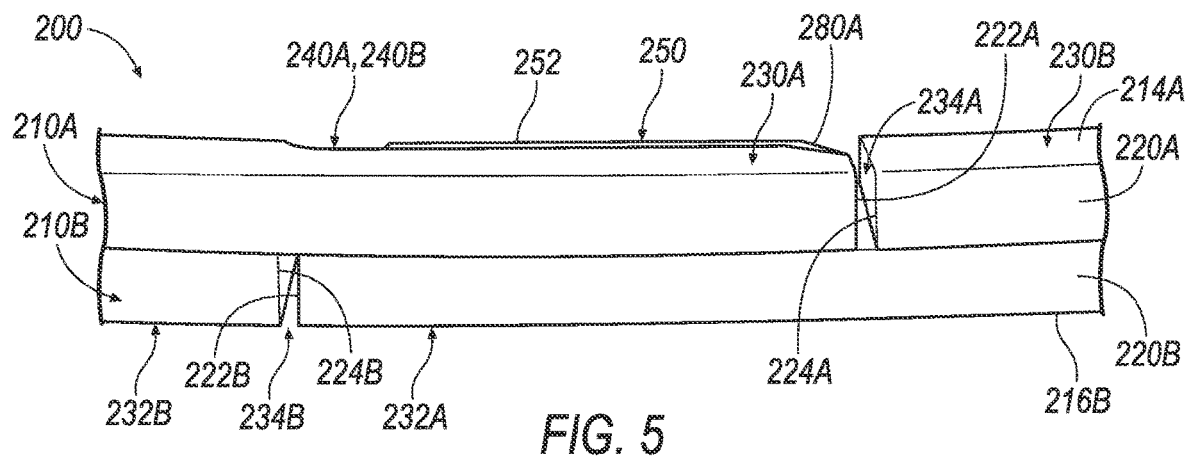
FIG. 5 is a radially inward view of the portion 4 of the split piston ring unit of FIG. 3 with the split piston ring unit in the first position.
Figure 6:
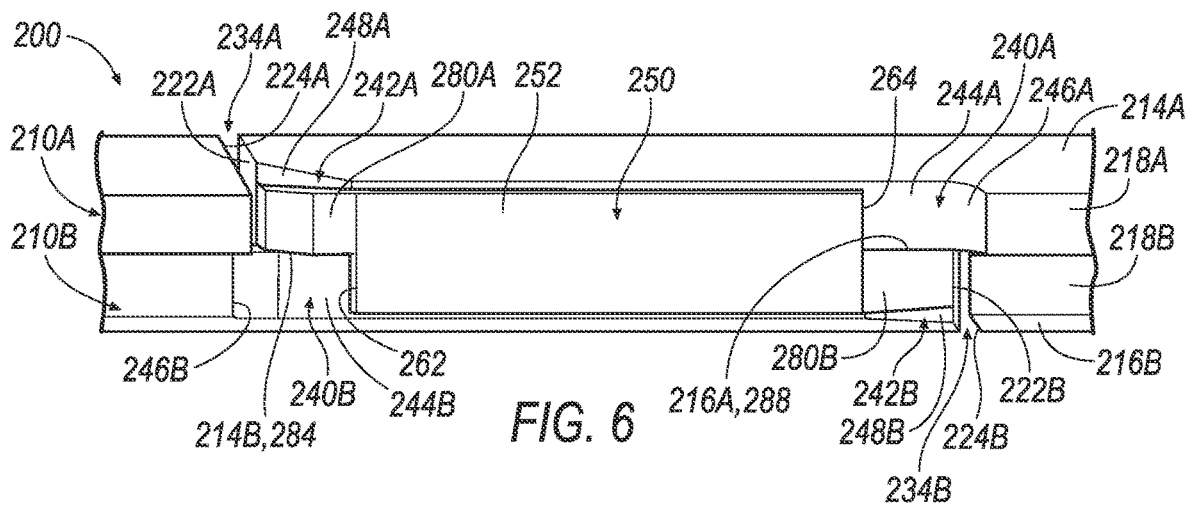
FIG. 6 is a radially outward view of the portion 4 of the split piston ring unit of FIG. 3 with the split piston ring unit in the first position.

FIG. 2 is a cross-sectional view of the split piston ring unit 200 disposed in the upper ring groove 114 of a piston 110 disposed in a cylinder 102 of an internal combustion engine 100. The split piston ring unit 200 includes a first ring body 210A and a second ring body 210B, which each have a central longitudinal ring axis 212A, 212B. The first ring body 210A and the second ring body 210B are arranged coaxially and the first ring body 210A is disposed on the second ring body 210B. The first ring body 210A may contact the second ring body 210B directly or indirectly (e.g., via a wear layer/coating). The first ring body 210A and the second ring body 218B may be arranged to move relative to one another (e.g., without a material connection between the first ring body 210A and the second ring body 210B) so as to allow a greater thermal expansion of the first ring body 210A relative to the second ring body 210B, as discussed in greater detail below. The ring bodies 210A, 210B may be made of steel, iron, or aluminum, for example.

The ring bodies 210A, 210B are each generally annular split ring bodies having an upper surface 214A, 214B, a lower surface 216A, 216B, an inner radial surface 218A, 218B, and an outer radial surface 220A, 220B. In some examples, one or more of the surfaces (e.g., the upper surface 214A of the first ring body 210A, the lower surface 216B of the second ring body 210B) may be defined and/or formed by several surfaces. The upper surface 214A, 214B, the lower surface 216A, 216B, the inner radial surface 218A, 218B, and the outer radial surface 220A, 220B provide the ring body 210A, 210B with a generally trapezoidal-shaped cross-sectional profile. Alternatively, one or both of the ring bodies 210A, 210B may have a cross-sectional profile with another desired shape, such as rectangular and/or semi-conical. A particular advantage of the split piston ring unit 200 is that it allows for optimal control of the flank shape tolerances and, at the same time, improves the achieved flank seal (i.e., improves blowby performance).

The upper surface 214A, 214B and the lower surface 216A, 216B extend generally in a radial direction and generally face in opposite axial directions. The upper surface 214A, 214B faces axially toward the piston crown 120 and the lower surface 216A, 216B faces axially toward the piston skirt 122. The lower surface 216A of the first ring body 210A is arranged on and directly contacts the upper surface 214B of the second ring body 210B.

The inner radial surface 218A, 218B and the outer radial surface 220A, 220B extend generally in a circumferential direction and generally face in opposite radial directions. The inner radial surface 218A, 218B faces generally towards the ring axis 212A, 212B in the radial direction and extends around the inner circumference of the ring body 210A, 210B from the upper surface 214A, 214B to the lower surface 216A, 216B. The outer radial surface 220A, 220B faces generally away from the ring axis 212A, 212B in the radial direction and extends around the outer circumference of the ring body 210A, 210B from the upper surface 214A, 214B to the lower surface 216A, 216B. The outer radial surface 220A, 220B is generally curved or arc shaped such that the ring body 210A, 210B is a barrel-shaped outer diameter ring body. As such, the outer radial surface 220A, 220B of the ring bodies 210A, 210B have a symmetrical profile, which may reduce the manufacturing costs of the ring bodies 210A, 210B and/or allow low-cost piston rings to be utilized for the ring bodies 210A, 210B. Alternatively, the outer radial surface 220A, 220B of one or both of the ring bodies 210A, 210B may be sloped or angled such that the ring body 210A, 210B is a tapered outer diameter ring body.

The second ring body 210B includes a plasma-coated layer disposed thereon. The plasma-coated layer may include a single or multi-layer structure. The plasma-coated layer at least partially, preferably completely, covers the exterior surfaces 214B-220B of the second ring body 210B. The plasma-coated layer reduces lubricating oil consumption during upward movement of the oil and/or during the upstroke phase of the piston 110. The plasma-coated layer also reduces tension on the second ring body 210B since there is no gas pressure at the outer diameter of the second ring body 210B or at the second piston ring land (i.e., the outer circumferential surface of the piston 110 defined between the upper ring groove 114 and the intermediate ring groove 116), which in turn reduces and/or eliminates the risk of the second ring body 210B fracturing. As non-limiting examples, the plasma-coated layer may be composed of a material including nickel or a nickel alloy (e.g., a nickel-chromium alloy), although other metals, metal alloys, cermets and oxides may be used.

FIGS. 3-9 depict an exemplary split piston ring unit 200. The ring bodies 210A, 210B are each generally annular split ring bodies 210A, 210B having a first circumferential end 230A, 230B, an opposite second circumferential end 232A, 232B, and a circumferential gap 234A, 234B disposed between the first end 230A, 230B and the second end 232A, 232B. The first circumferential end 230A, 230B may be notched and the second circumferential end 232A, 232B may be un-notched, as discussed below. The first ring body 210A extends from the first circumferential end 230A to the second circumferential end 232A in a first circumferential direction. The second ring body 210B extends from the first circumferential end 230B to the second circumferential end 232B in an opposite, second circumferential direction.

The gap 234A, 234B is defined by and between a first circumferential end face 222A, 222B and a second circumferential end face 224A, 224B of the ring body 210A, 210B. The circumferential lengths 140A, 140B of the gaps 234A, 234B are equal to one another in the illustrative examples herein, but may alternatively be different from one another. The first end face 222A, 222B is a surface disposed at the first end 230A, 230B of the ring body 210A, 210B that generally faces toward the second end face 224A, 224B in the circumferential direction. The first end face 222A, 222B extends between and connects the upper surface 214A, 214B, the lower surface 216A, 216B, the outer radial surface 220A, 220B, and a second transition surface 248A, 248B of the ring body 210A, 210B. The second end face 224A, 224B is a surface disposed at the second end 232A, 232B of the ring body 210A, 210B that generally faces toward the first end face 222A, 222B in the circumferential direction. The second end face 224A, 224B extends between and connects the upper surface 214A, 214B, the lower surface 216A, 216B, the inner radial surface 218A, 218B, and the outer radial surface 220A, 220B.

The first end 230A, 230B includes a recess (e.g., a first recess and a second recess) 240A, 240B disposed on a radially inner side of the ring body 210A, 210B at the gap 234A, 234B, which gives the first end 230A, 230B a notched profile. The recesses 240A, 240B may at least partially overlap one another in the circumferential direction. The recess 240A, 240B projects into the ring body 210A, 210B in a radially outward direction and opens into the gap 234A, 234B through the first end face 222A, 222B. The recess 240A, 240B includes a portion and/or an extension 242A, 242B (also referred to as a recess extension 242A, 242B) that projects further into the ring body 210A, 210B in the radially outward direction then one or more other portions of the recess 240A, 240B (e.g., a remainder of the recess 240A, 240B). The recess 240A, 240B is at least partially defined and/or delimited by one or more surfaces of the ring body 210A, 210B. As depicted in the exploded view of FIG. 9, the recess 240A, 240B is the space defined by a recess base surface 244A, 244B, a first transition surface 246A, 246B, and a second transition surface 248A, 248B of the ring body 210A, 210B. The recess extension 242A, 242B is the portion of the recess 240A, 240B and/or the space above the second transition surface 248A, 248B that is disposed radially further from the ring axis 212A, 212B than the recess base surface 244A, 244B. The maximum radial depth 142A, 142B of the recess extension 242A, 242B (i.e., the radial distance between the radially inner end of the first end face 222A, 222B and an imaginary plane that is coplanar with the inner radial surface 218A, 218B) is at least 2.5 times larger than the radial distance 136 defined by and between one or more of the inner radial surfaces 218A, 218B and the base 134 of the ring groove 114 (see, e.g., FIG. 2), which prevents the spacer insert 250 from becoming removed from the recesses 240A, 240B. The radial length 144A, 144B of the first end face 222A, 222B is at least 0.5 times the radial length 146A, 146B of the second end face 224A, 224B, which ensures that the first end 230A, 230B has sufficient strength and/or stiffness to resist premature fracture during operation.

The recess base surface 244A, 244B at least partially forms a base of the recess 240A, 240B and faces generally towards the ring axis 212A, 212B in the radial direction. The recess base surface 244A, 244B is disposed offset from the inner radial surface 218A, 218B and the outer radial surface 220A, 220B in the radial direction (i.e., is disposed further from the ring axis 212A, 212B than the inner radial surface 218A, 218B and closer to the ring axis 212A, 212B than the outer radial surface 220A, 220B in the radial direction). The recess base surface 244A, 244B extends between and connects the upper surface 214A, 214B and the lower surface 216A, 216B. The circumferential distance 148A, 148B between the end of the recess base surface 244A, 244B connected to the second transition surface 248A, 248B and the first end face 222A, 222B (i.e., the maximum circumferential length of the recess extension 242A, 242B) is at least 1.5 times larger than the radial thickness 150 of the base body 252 of the spacer insert 250.

The first transition surface 246A, 246B extends between and connects the recess base surface 244A, 244B and the inner radial surface 218A, 218B. The first transition surface 246A, 246B also extends between and connects the upper surface 214A, 214B and the lower surface 216A, 216B. The first transition surface 246A, 246B is a curved surface in the illustrative example of FIGS. 3-9. Alternatively, the first transition surface 246A, 246B may have other configurations such as a planar surface that extends obliquely or perpendicularly relative to the inner radial surface 218A, 218B and/or the recess base surface 244A, 244B. In the illustrative examples herein, the circumferential distance 152A, 152B between the first transition surface 246A, 246B and the second end face 224A, 224B (see, e.g., FIGS. 7 and 8) is larger than, but may alternatively be equal to, the sum of the circumferential length 154 of the spacer insert 250 (i.e., the circumferential distance between the projection end faces 286A, 286B), the circumferential length 140A of the gap 234A, and the circumferential length 140B of the gap 234B, which ensures that the ring bodies 210A, 201B are able to move relative to one another properly during operation as described in more detail below.

The second transition surface 248A, 248B extends between and connects the recess base surface 244A, 244B and the first end face 222A, 222B. The second transition surface 248A, 248B also extends between and connects the upper surface 214A, 214B and the lower surface 216A, 216B. The second transition surface 248A, 248B is a planar, radially outwardly sloped surface that extends obliquely relative to the recess base surface 244A, 244B and the first end face 222A, 222B. An angle $\alpha_A$, $\alpha_B$ defined by and between the recess base surface 244A, 244B and the second transition surface 248A, 248B is set such that the maximum radial depth 142A, 142B of the recess extension 242A, 242B is 2.5 times larger than the radial distance 136 defined by and between one or more of the inner radial surfaces 218A, 218B and the base 134 of the ring groove 114 (see, e.g., FIG. 2). The angle $\alpha_A$, $\alpha_B$ are each approximately 45°, which facilitates the spacer insert 250 maintaining its full, three-dimensional degree of freedom within the recesses 240A, 240B while also engaging the ring bodies 210A, 210B. Alternatively, the second transition surface 248A, 248B may be a curved surface.

In the illustrative example of FIGS. 3-9, the first transition surface 246A, 246B and the recess base surface 244A, 244B are sections, regions, and/or portions of a singular surface, while the second transition surface 248A, 248B is a separate surface. However, different combinations of the recess base surface 244A, 244B, the first transition surface 246A, 246B, and the second transition surface 248A, 248B may be separate surfaces and/or may be defined by sections, regions, and/or portions of a singular surface in other examples.

The ring bodies 210A, 210B are oriented in an offset orientation where the gaps 234A, 234B are disposed spaced apart from one another in the circumferential direction by an offset distance 236 (e.g., the gaps 234A, 234B are circumferentially offset or misaligned from one another). In the offset orientation of the ring bodies 210A, 210B, the first ring body 210A at least partially closes and/or covers an upper axial end of the gap 234B of the second ring body 210B and the second ring body 210B at least partially closes and/or covers a lower axial end of the gap 234A of the first ring body 210A. Additionally, the recesses 240A, 240B overlap one another and/or are at least partially aligned with one another in the axial direction in the offset orientation of the ring bodies 210A, 210B.

The offset arrangement of the gaps 234A, 234B and the covered gaps 234A, 234B provided by the offset orientation of the ring bodies 210A, 210B effectively blocks air (e.g., combustion gas) from flowing through the gaps 234A, 234B, which significantly restricts and/or effectively prevents blowby at the outer diameter of the split piston ring unit 200. In this manner, the split piston ring unit 200 virtually eliminates the blowby the occurs in conventional split piston rings due to the gap 234A, 234B and, thus, outperforms conventional split piston rings with respect to blowby. Furthermore, since air (e.g., combustion gas) is effectively blocked from flowing through the gaps 234A, 234B, the size of the gaps 234A, 234B has a reduced impact on blowby performance of the split piston ring unit 200 compared to conventional split piston rings. The offset arrangement of the gaps 234A, 234B and the covered gaps 234A, 234B provided by the offset orientation of the ring bodies 210A, 210B, thus, enables the gaps 234A, 234B to have a larger circumferential length then conventional split piston rings without sacrificing performance. For example, conventional split piston rings generally require gaps having a circumferential length of 0.5 mm or less, while the gaps 234A, 234B of the split piston ring unit 200 described herein each have a circumferential length 140A, 140B that is greater than 0.5 mm and less than or equal to 1.5 mm. This in turn increases manufacturing tolerances, decreases manufacturing costs, and reduces the risk associated with the circumferential ends 230A, 232A, 230B, 232B of the ring bodies 210A, 210B contacting one another during operation (e.g., due to thermal expansion).

The split piston ring unit 200 further includes a spacer insert 250 that is coupled to the ring bodies 210A, 210B and is arranged in the offset distance 236 between the first gap 234A and the second gap 234B to maintain the offset orientation of the ring bodies 210A, 210B. For example, the spacer insert 250 is arranged in the recesses 240A, 240B of the ring bodies 210A, 210B to separate the first gap 234A and the second gap 234B from one another. The spacer insert 250 is able to move within the recesses 240A, 240B relative to the ring bodies 210A, 210B and is prevented from becoming removed from the recesses 240A, 240B at least via the upper flank 130, the lower flank 132, and the base 134 of the upper ring groove 114 in which the split piston ring unit 200 is arranged (see FIG. 2). The spacer insert 250 engages the ring bodies 210A, 210B and couples the ring bodies 210A, 210B together with relative movement. During operation, the ring bodies 210A, 210B shift, rotate, tilt, and/or otherwise move relative to one another, the spacer insert 250, and/or the piston body 112 (e.g., the upper ring groove 114). The spacer insert 250 limits and/or restricts relative movement between the ring bodies 210A, 210B to maintain the offset orientation of the ring bodies 210A, 210B (i.e., the offset arrangement of the gaps 234A, 234B), while simultaneously allowing the split piston ring unit 200 to move relative to the piston body 112. If the ring bodies 210A, 210B were to shift out of the offset orientation to a position/orientation where the gaps 234A, 234B overlap and/or are at least partially axially aligned with one another, the gaps 234A, 234B would collectively form a passageway through which air (e.g., combustion gas) could flow past the split piston ring unit 200, which would promote blowby. The spacer insert 250 effectively prevents the ring bodies 210A, 210B from moving and/or shifting out of the offset orientation to ensure proper functioning and performance of the split piston ring unit 200 during operation. The spacer insert 250 may be made from the same or different material as the ring bodies 210A, 210B, e.g., steel, iron, or aluminum.

The spacer insert 250 includes a base body 252 having an upper surface 254, a lower surface 256, a radially inner surface 258, a radially outer surface 260, a first end face 262, and a second end face 264. The first end face 262 is a surface disposed at a first end 266 of the base body 252 and the second end face 264 is a surface disposed at an opposite, second end 268 of the base body 252. The spacer insert 250 further includes a plurality of projections or fingers (hereafter projections) 280A, 280B that engage the ring bodies 210A, 210B such that the spacer insert 250 couples the ring bodies 210A, 210B together. The plurality of projections 280A, 280B also restrict and/or prevent the spacer insert 250 from being removed from the recesses 240A, 240B in the axial direction. The plurality of projections 280A, 280B includes a first projection 280A for engaging the first ring body 210A and a second projection 280B for engaging the second ring body 210B. The first projection 280A and the second projection 280B are disposed at opposite ends 266, 268 of the base body 252.

The circumferential length 154 of the spacer insert 250 (i.e., the circumferential distance between the projection end faces 286A, 286B) is at least 3 times larger than the circumferential length 156A, 156B of one or more of the projections 280A, 280B. The radial thickness 150 of the base body 252 (i.e., the radial distance between the radially inner surface 258 and the radially outer surface 260) is smaller than, but may alternatively be equal to, the radial depth 158A, 158B of the recess 240A, 240B outside of the recess extension 242A, 242B (i.e., the radial distance between the recess base surface 244A, 244B and an imaginary plane that is coplanar with the inner radial surface 218A, 218B), which may enable the spacer insert 250 to be completely received within the recesses 240A, 240B. The radial thickness 150 of the base body 252 may vary based on one or more material properties of the spacer insert 250, such as stiffness and/or break resistance. The radial thickness 150 of the base body 252 is equal to or greater than a minimal radial thickness that provides the base body 252 with a desired stiffness.

The first projection 280A is arranged at the first end 266 of the base body 252 extends into the recess extension 242A of the first ring body 210A. The first projection 280A includes a first projection radial surface 282A, a first projection lower surface 284, and a first projection end face 286A. The first projection lower surface 284 is configured in a complimentary manner to the upper surface 214B of the second ring body 210B. The first projection radial surface 282A is configured in a complimentary manner to the second transition surface 248A of the first ring body 210A. As such, the first projection radial surface 282A is a radially outward sloped planar surface in the illustrative examples herein, but may have other configurations depending on the second transition surface 248A of the first ring body 210A.

The second projection 280B is arranged at the second end 268 of the base body 252 and extends into the recess extension 242B of the second ring body 210B. The second projection 280B includes a second projection radial surface 282B, a second projection upper surface 288, and a second projection end face 286B. The second projection upper surface 288 is configured in a complimentary manner to the lower surface 216A of the first ring body 210A. The second projection radial surface 282B is configured in a complimentary manner to the second transition surface 248B of the second ring body 210B. As such, the second projection radial surface 282B is a radially outward sloped planar surface, but may have other configurations depending on the second transition surface 248B of the second ring body 210B.

Figure 10:
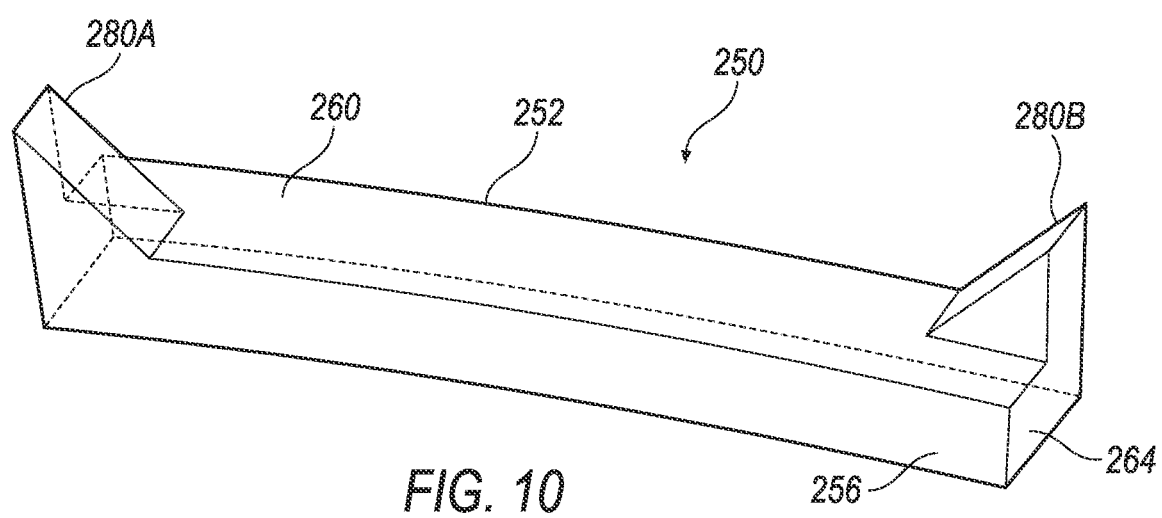
FIG. 10 is a perspective view of another exemplary spacer insert.

In the illustrative example of FIGS. 3-9, the first projection 280A protrudes circumferentially from the first end face 262 of the base body 252 and is angled radially outward such that the first projection 280A extends obliquely to the base body 252. The second projection 280B protrudes circumferentially from the second end face 264 of the base body 252 and is angled radially outward such that the second projection 280B extends obliquely to the base body 252. Alternatively, the first projection 280A and/or the second projection 280B may be arranged on and/or protrude radially outward from the radially outer surface 260 of the base body 252 as shown in FIG. 10. Due to the angled configuration of the projections 280A, 280B and/or the projection radial surfaces 282A, 282B, the spacer insert 250 maintains its full, three-dimensional degree of freedom within the recesses 240A, 240B, while also engaging the ring bodies 210A, 210B and maintaining the offset orientation of the ring bodies 210A, 210B.

The circumferential length 156A, 156B of the projections 280A, 280B, which is equal to the circumferential distance between the end face 262, 264 and the projection end face 286A, 286B in the illustrative examples herein, is equal to the maximum circumferential length 148A, 148B of the recess extension 242A, 242B. In other examples, however, the circumferential length 156A, 156B of the projections 280A, 280B may not be equal to (e.g., may be smaller or larger than) the maximum circumferential length 148A, 148B of the recess extension 242A, 242B. The projections 280A, 280B project from the base body 225 a radial distance 160A, 160B that is at least equal to the radial thickness 150 of the base body 252, which helps prevent the spacer insert 250 from becoming removed from the recesses 240A, 240B. When the split piston ring unit 200 is in the first position illustrated in FIG. 7, the circumferential distance 162A, 162B between the end face 262, 264 and the end of the inner radial surface 218A, 281B connected to the first transition surface 246A, 246B is equal to or larger than (i) the sum of the circumferential length 104A, 140B of the radially adjacent gap 234A, 234B and the circumferential length 156A, 156B of the radially adjacent projection 280A, 280B and (ii) the sum of the circumferential length of the first transition surface 246A, 246B, the circumferential length 140A of the gap 234A, and the circumferential length 140B of the gap 234B.

As illustrated in FIGS. 4-8, the spacer insert 250 is disposed in both of the recesses 240A, 240B simultaneously and directly contacts both of the ring bodies 210A, 210B.

The base body 252 of the spacer insert 250 contacts and/or lies against the recess base surface 244A, 244B of each ring body 210A, 210B. The first projection 280A extends into and is disposed in the recess extension 242A and/or the gap 234A of the first ring body 210A. The second projection 280B extends into and is disposed in the recess extension 242B and/or the gap 234B of the second ring body 210B. The first projection lower surface 284 may contact and/or rest on the upper surface 214B of the second ring body 210B, which may restrict and/or prevent the spacer insert 250 from being removed from the recesses 240A, 240B in the axially downward direction. The second projection upper surface 288 may contact and/or rest on the lower surface 216A of the first ring body 210A, which may restrict and/or prevent the spacer insert 250 from being removed from the recesses 240A, 240B in the axially upward direction.

Figure 7:
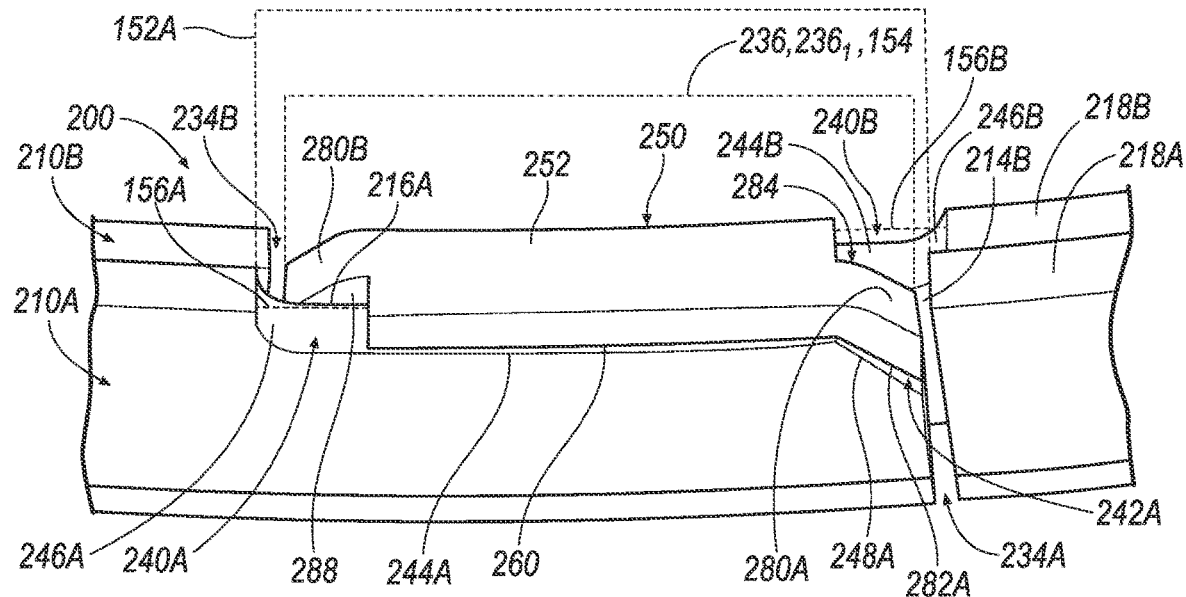
FIG. 7 is a perspective view of the portion 4 of the split piston ring unit of FIG. 3 with the split piston ring unit in the first position.
Figure 8:
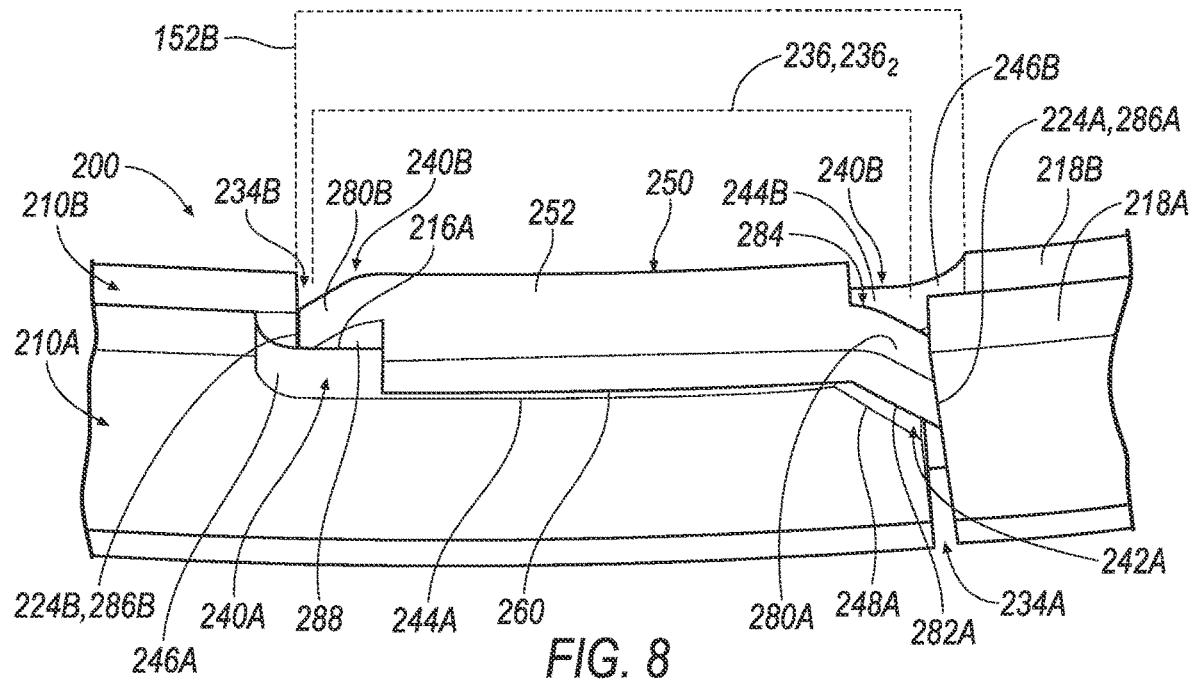
FIG. 8 is a perspective view of the portion 4 of the split piston ring unit of FIG. 3 with the split piston ring unit in a second position.
Figure 9:
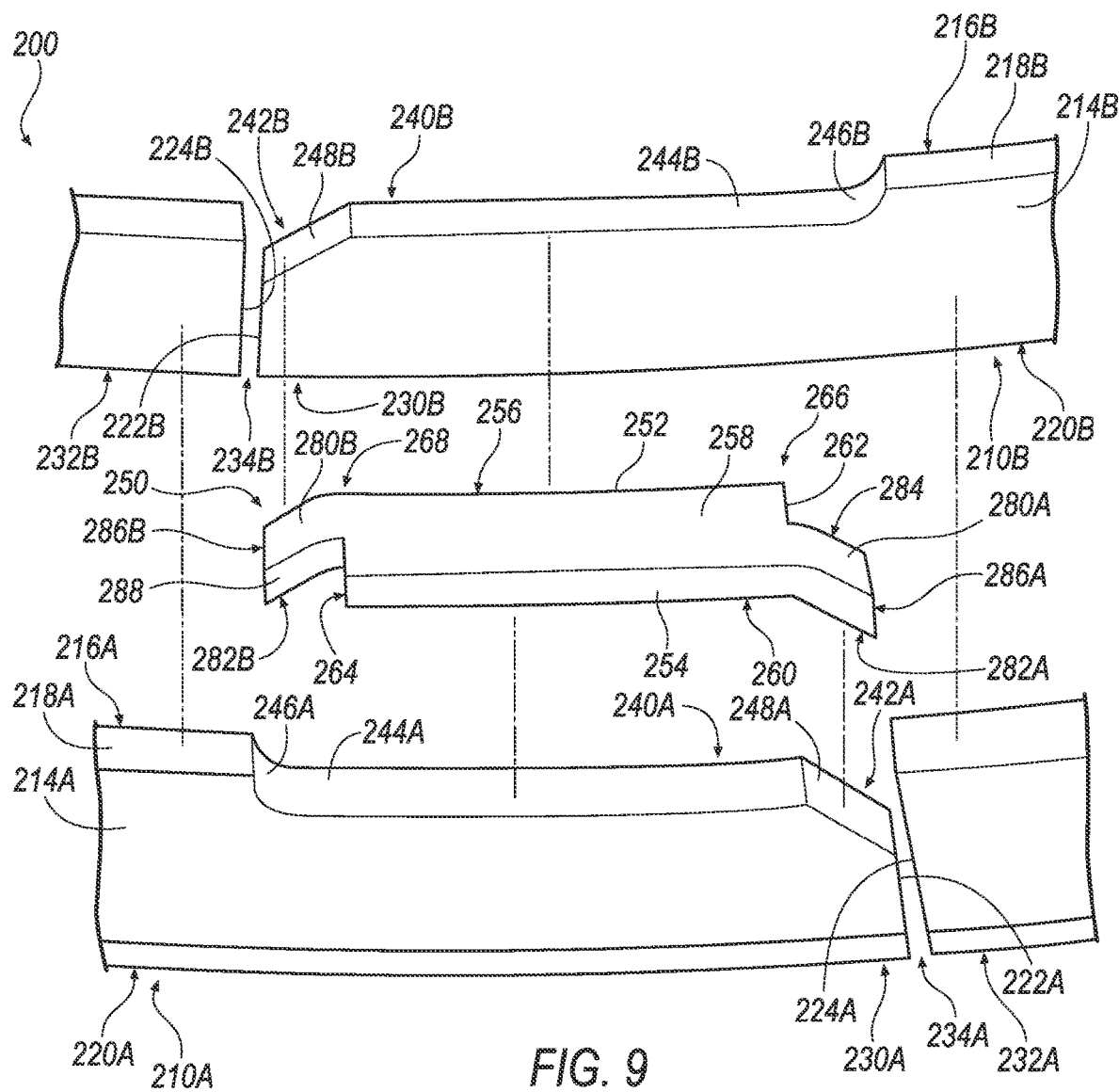
FIG. 9 is an exploded view of the portion 4 of the split piston ring unit of FIG. 3.

The first ring body 210A and the second ring body 210B are able to move relative to one another and to the spacer insert 250 when the spacer insert 250 is arranged in the recesses 240A, 240B. For example, one or both of the ring bodies 210A, 210B are able to rotate about their respective ring axis 212A, 212B to move the gaps 234A, 234B further apart and increase the offset distance 236 until the first projection radial surface 282A contacts and/or abuts the second transition surface 248A of the first ring body 210A and the second projection radial surface 282B contacts and/or abuts the second transition surface 248B of the second ring body 210B as shown in FIG. 7, at which point the spacer insert 250 blocks and/or prevents further rotation of the ring bodies 210A, 210B. One or both of the ring bodies 210A, 210B are also able to rotate about the respective ring axis 212A, 212B to move the gaps 234A, 234B closer together and decrease the offset distance 236 between the gaps 234A, 234B until the first projection end face 286A contacts and/or abuts the second end face 224A of the first ring body 210A and the second projection end face 286B contacts and/or abuts the second end face 224B of the second ring body 210B as shown in FIG. 8, at which point the spacer insert 250 blocks and/or prevents further rotation of the ring bodies 210A, 210B. The first projection 280A is disposed partially in the recess extension 242A and partially in the gap 234A of the first ring body 210A and the first projection radial surface 282A does not contact the second transition surface 248A of the first ring body 210A when in the second position depicted in FIG. 8. Additionally, the second projection 280B is disposed partially in the recess extension 242B and partially in the gap 234B of the second ring body 210B and the second projection radial surface 282B does not contact the second transition surface 248B of the second ring body 210B when in the second position depicted in FIG. 8. Thus, the offset distance $236_1$ when the split piston ring unit 200 is in the first position illustrated in FIG. 7 is greater than the offset distance 2362 when the split piston ring unit 200 is in the second position illustrated in FIG. 8. In this manner, the spacer insert 250 effectively prevents the ring bodies 210A, 210B from moving and/or shifting out of the offset orientation to ensure proper functioning and performance of the split piston ring unit 200 during operation.

An exemplary method of assembling the disclosed piston 110 includes the following steps. The method includes providing a piston body 112. The spacer insert 250 is inserted into and/or arranged in the upper ring groove 114 of the piston body 112. Then the first ring body 210A is connected to the piston body 112 via inserting the first ring body 210A into the upper ring groove 114. The first ring body 210A and the spacer insert 250 are then engaged with each other via adjusting the first ring body 210A and/or the spacer insert 250 to arrange the base body 252 in the recess 240A of the first ring body 210A and the first projection 280A of the spacer insert 250 in the recess extension 242A of the first ring body 210A. Next, the second ring body 210B is connected to the piston body 112 via inserting the second ring body 210B into the upper ring groove 114. The second ring body 210B and the spacer insert 250 are subsequently engaged with each other to form the split piston ring unit 200. The second ring body 210B and the spacer insert 250 are engaged with one another via adjusting the second ring body 210B and/or the spacer insert 250 to arrange the base body 252 in the recess 240B of the second ring body 210B and the second projection 280B of the spacer insert 250 in the recess extension 242B of the second ring body 210B.

An exemplary method of assembling the disclosed split piston ring unit 200 may include the following steps. The method includes providing a first ring body 210A, a second ring body 210B, and a spacer insert 250. The first ring body 210A and the spacer insert 250 are engaged with each other via adjusting the first ring body 210A and/or the spacer insert 250 to arrange the base body 252 in the recess 240A of the first ring body 210A and the first projection 280A of the spacer insert 250 in the recess extension 242A of the first ring body 210A. Next, the second ring body 210B and the spacer insert 250 are engaged with each other to connect the ring bodies 210A, 210B together and form the split piston ring unit 200. The second ring body 210B and the spacer insert 250 are engaged with one another via adjusting the second ring body 210B and/or the spacer insert 250 to arrange the base body 252 in the recess 240B of the second ring body 210B and the second projection 280B of the spacer insert 250 in the recess extension 242B of the second ring body 210B.

Accordingly, the split piston ring unit 200 effectively provides a gap-free upper piston ring assembly where the spacer insert 250 fits into the inner surfaces 218A, 218B of the piston ring bodies 210A, 210B to maintain misaligned circumferential gaps 234A, 234B. That is, the ring bodies 210A, 210B do not have a common effective end gap. By separating these gaps 234A, 234B the blowby effect that occurs with a conventional upper compression ring due to its conventional functional gap is virtually eliminated. Further, in the case of a working upper compression ring, especially at high temperatures, the circumferential length tends to increase (expand) slightly so that its outside diameter exceeds the nominal diameter of the cylinder bore. In situations where the circumferential gap is too small, there is a risk that the ends of the compression ring will touch. With the split piston ring unit 200 according to the disclosure, the gaps 234A, 234B can be increased and/or tolerated larger because the gas, due to the forced separation of upper and lower gaps 234A, 234B via the spacer insert 250, does not pass through or blow-by. This also has the advantage of minimizing manufacturing costs.

The piston ring bodies 210A, 210B have recesses 240A, 240B on their inner diameter that accommodate the spacer insert 250 in their original envelope. The radially outwardly extending fingers or projections 280A, 280B of the spacer insert 250 allow its full, three-dimensional degree of freedom while ensuring that the gaps 234A, 234B are effectively kept apart or separated. This practically and effectively prevents blow-though at the outer diameter of the piston ring. As a result, the tension on the lower ring body 210B may be reduced as there is less gas pressure at the outer diameter or the second piston ring groove, to help reduce or eliminate the risk of a possible ring fracture. Another advantage is the ability to eliminate mutual contact between the piston rings by allowing a larger piston ring end gap without sacrificing performance. In addition, optimal control of the flank shape tolerances can be carried out and at the same time the flank seal can be improved. For example, a low-cost piston ring unit with a symmetrical outer diameter profile can be used.

Various examples/embodiments are described herein for various articles and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Accordingly, even though the present disclosure has been described in detail with reference to specific examples, it will be appreciated that the various modifications and changes can be made to these examples without departing from the scope of the present disclosure as set forth in the claims. It is anticipated and intended that future developments will occur in the technologies discussed herein, and that the disclosed article, device and/or method will be incorporated into such future developments. Thus, the specification and the drawings are to be regarded as an illustrative thought instead of merely restrictive thought.

With respect to the foregoing discussion, it is noted that specific directional conventions are assumed to be known to those skilled in the art. In this context, the respective central longitudinal ring axis of the ring body provides directional relationship for the terms "axially" (or its equivalents), "radially" (or its equivalents), and "circumferentially" (or its equivalents). For example, "radially" or "radial direction" extends transversely to the respective ring axis.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Further, all numbers expressing dimensions, ratios and the like, used in the specification and claims, are to be understood to encompass tolerances and other deviations as represented by the term "about" or "approximately." Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments. For example, although the drawings show the crochet hook oriented vertically with respect to the drawing sheet, it will be appreciated that crocheting using gravity and that the crotchet hook may be oriented horizontally in operation.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

All matter contained in the above description or shown in the accompanying drawings shall be interpreted as illustrative only and not limiting. Changes in detail or structure may be made without departing from the present disclosure.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of "at least one of" is intended to be inclusive, analogous to the term and/or. As an example, the phrase "at least one of A, B and C" includes A only, B only, C only, or any combination thereof (e.g. AB, AC, BC or ABC). Additionally, use of adjectives such as first, second, etc. should be read to be interchangeable unless a claim recites an explicit limitation to the contrary.

What is claimed is:

1. A split piston ring unit, comprising:
   a first ring body defining a first circumferential gap;
   a second ring body defining a second circumferential gap;
   a spacer insert coupled to the first ring body and the second ring body;
   the first ring body and the second ring body arranged coaxially and oriented in an offset orientation where the first circumferential gap and the second circumferential gap are disposed circumferentially offset from one another by an offset distance; and wherein the spacer insert is disposed in the offset distance between the first circumferential gap and the second circumferential gap to maintain the offset orientation.

2. The split piston ring unit according to claim 1, wherein:
the first ring body includes a first recess disposed at the first circumferential gap;
the second ring body includes a second recess disposed at the second circumferential gap;
the first recess and the second recess overlap one another; and
the spacer insert is disposed in the first recess and the second recess to separate the first circumferential gap from the second circumferential gap.

3. The split piston ring unit according to claim 2, wherein the first recess and the second recess are disposed on a radially inner side of the first ring body and the second ring body, respectively.

4. The split piston ring unit according to claim 2, wherein:
the first ring body has a first circumferential end face and a second circumferential end face defining the first circumferential gap therebetween;
the first recess opens into the first circumferential gap through the first circumferential end face of the first ring body;
the second ring body has a first circumferential end face and a second circumferential end face defining the second circumferential gap therebetween; and
the second recess opens into the second circumferential gap through the first circumferential end face of the second ring body.

5. The split piston ring unit according to claim 4, wherein at least one of:
the first recess is defined by a first recess base surface of the first ring body and a first radially outwardly sloped surface of the first ring body extending from the first recess base surface to the first circumferential end face of the first ring body; and
the second recess is defined by a second recess base surface of the second ring body and a second radially outwardly sloped surface of the second ring body extending from the second recess base surface to the second circumferential end face of the second ring body.

6. The split piston ring unit according to claim 4, wherein:
the first ring body extends from the first circumferential end face to the second circumferential end face in a first circumferential direction; and
the second ring body extends from the first circumferential end face to the second circumferential end face in a second circumferential direction opposite the first circumferential direction.

7. The split piston ring unit according to claim 1, wherein the spacer insert includes:
a base body;
a first projection extending circumferentially from a first end of the base body; and
a second projection extending circumferentially from a second end of the base body.

8. The split piston ring unit according to claim 7, wherein the first projection and the second projection protrude radially outward from the base body.

9. The split piston ring unit according to claim 8, wherein the first projection and the second projection are angled radially outward and extend obliquely relative to the base body.

10. The split piston ring unit according to claim 1, wherein the second ring body has a plasma-coated layer disposed thereon.

11. The split piston ring unit according to claim 1, wherein:
the first ring body covers an axial end of the second circumferential gap; and
the second ring body covers an axial end of the first circumferential gap.

12. The split piston ring unit according to claim 1, wherein at least one of the first ring body and the second ring body is at least one of a barrel-shaped outer diameter ring body and a tapered outer diameter ring body.

13. The split piston ring unit according to claim 1, wherein:
the first ring body, the second ring body, and the spacer insert are movable relative to one another; and
relative movement of the first ring body, the second ring body, and the spacer insert is limited via the spacer insert.

14. A piston for a combustion engine, comprising at least one ring groove and a split piston ring unit arranged in the at least one ring groove, the split piston ring unit including:
a first ring body defining a first circumferential gap;
a second ring body defining a second circumferential gap;
a spacer insert coupled to the first ring body and the second ring body;
the first ring body and the second ring body arranged coaxially and oriented in an offset orientation where the first circumferential gap and the second circumferential gap are disposed circumferentially offset from one another by an offset distance; and
wherein the spacer insert is disposed in the offset distance between the first circumferential gap and the second circumferential gap to maintain the offset orientation.

15. The piston according to claim 14, wherein:
the first ring body includes a first recess disposed at the first circumferential gap;
the second ring body includes a second recess disposed at the second circumferential gap;
the first recess and the second recess overlap one another; and
the spacer insert is disposed in the first recess and the second recess to separate the first circumferential gap from the second circumferential gap.

16. The piston according to claim 15, wherein:
the first ring body covers an axial end of the second circumferential gap; and
the second ring body covers an axial end of the first circumferential gap.

17. The piston according to claim 14, wherein the spacer insert includes:
a base body;
a first projection extending circumferentially from a first end of the base body; and
a second projection extending circumferentially from a second end of the base body;
wherein the first projection and the second projection are angled radially outward and extend obliquely relative to the base body.

18. An internal combustion engine, comprising at least one cylinder, a piston slidably arranged in the at least one cylinder, and a split piston ring unit arranged in a ring groove of the piston, the split piston ring unit including:
a first ring body defining a first circumferential gap;
a second ring body defining a second circumferential gap;

a spacer insert coupled to the first ring body and the second ring body;

the first ring body and the second ring body arranged coaxially and oriented in an offset orientation where the first circumferential gap and the second circumferential gap are disposed circumferentially offset from one another by an offset distance; and wherein the spacer insert is disposed in the offset distance between the first circumferential gap and the second circumferential gap to maintain the offset orientation.

19. The internal combustion engine according to claim 18, wherein:

the first ring body includes a first recess disposed at the first circumferential gap;

the second ring body includes a second recess disposed at the second circumferential gap;

the first recess and the second recess overlap one another; and the spacer insert is disposed in the first recess and the second recess to separate the first circumferential gap from the second circumferential gap.

20. The internal combustion engine according to claim 18, wherein:

the spacer insert includes a base body, a first projection, and a second projection; and the first projection and the second projection protrude radially outward from the base body and are disposed at opposite ends of the base body.

* * * * *